United States Patent [19]

Morchand et al.

[11] 3,745,240

[45] July 10, 1973

[54] TELEVISION TRANSMISSION METHODS AND APPARATUS

[75] Inventors: Charles A. Morchand, New York; Don J. Dudley, Brightwaters, both of N.Y.

[73] Assignee: Data-Plex Systems, Inc., New York, N.Y.

[22] Filed: Oct. 29, 1970

[21] Appl. No.: 85,121

[52] U.S. Cl. .......... 178/5.6, 178/5.8 R, 178/DIG. 23
[51] Int. Cl. .......... H04n 7/08
[58] Field of Search .......... 178/5.6, 5.8 R, DIG. 23, 178/DIG. 35, DIG. 3

[56] References Cited

UNITED STATES PATENTS 3,586,767 6/1971 Morchand .......... 178/DIG. 23
3,456,071 7/1969 Jackson et al. .......... 178/5.6
3,383,461 5/1968 Dryden .......... 178/DIG. 3
3,423,526 1/1969 Law .......... 178/DIG. 3

OTHER PUBLICATIONS

NASA Tech. Brief No. 67-10576, Dec. 1967, (no author), "Multiplex Television Transmission System".

*Primary Examiner*—Robert L. Griffin
*Assistant Examiner*—George G. Stellar
*Attorney*—Hane, Baxley & Spiecens

[57] ABSTRACT

A television system transmits a general viewer television program and special viewer program on a common channel. As the fields of the general viewer television program are fed to the transmitter they are monitored for a scene cut. When the scene cut is sensed a field of the special viewer program is substituted for a field of the general viewer television program. Thereafter a special viewer program field is substituted for each same given number of general viewer television program fields.

6 Claims, 10 Drawing Figures

INVENTORS
Charles A. Morchand
Don J. Dudley
BY Hane, Baxley and Spiecens
ATTORNEYS

TELEVISION TRANSMISSION METHODS AND APPARATUS

This invention pertains to the transmission of television information and more particularly to the transmission of special viewer television information.

Lately, there has been a demand for the transmisson of television information to special viewers such as students and scholars. This class of people comprise a small group of the general population. While it is true that special closed circuit television systems can satisfy their needs, the cost of such systems make this solution economically impossible.

Accordingly, there have been proposed systems wherein the special viewer program fields are interspersed in the transmission of fields of general viewer television programs. Such systems either periodically substitute a field of the special viewer program for a field of the general viewer television program or periodically superimpose a field or fields of the special viewer program on a field or fields of the general viewer television program. At specially modified receivers the fields of the special viewer program are extracted. However, in order to extract the special fields, these fields must be identified. Heretofore, control signals have been inserted at the start of such fields to perform the identification. However, these control signals have created problems.

It is accordingly a general object of the invention to provide improved apparatus and methods for identifying fields of a special viewer program interspersed in the transmission of fields of a general viewer television program.

The invention relies on the fact that in any general viewer television program there are scene cuts. These scene cuts occur when a scene changes. This can occur during the normal formatting of the program. In fact, it has been found that such cuts occur on the average of at least once per minute. Accordingly, the invention contemplates a method for transmitting a general viewer television program and a special viewer program in a common channel. During the transmission of the fields of the general viewer program a scene cut is sensed. A field of the special viewer program is then transmitted, and periodically thereafter, for each given number of fields of the general viewer television program, a field of the special viewer program is transmitted. This "special" field can be superimposed on the "general" field or substituted for the "general" field.

Other objects, the features and advantages of the invention will be apparent from the following detailed description when read with the accompanying drawings which show, by way of example, a reconstructible television system utilizing the invention.

Figures 1, 2:
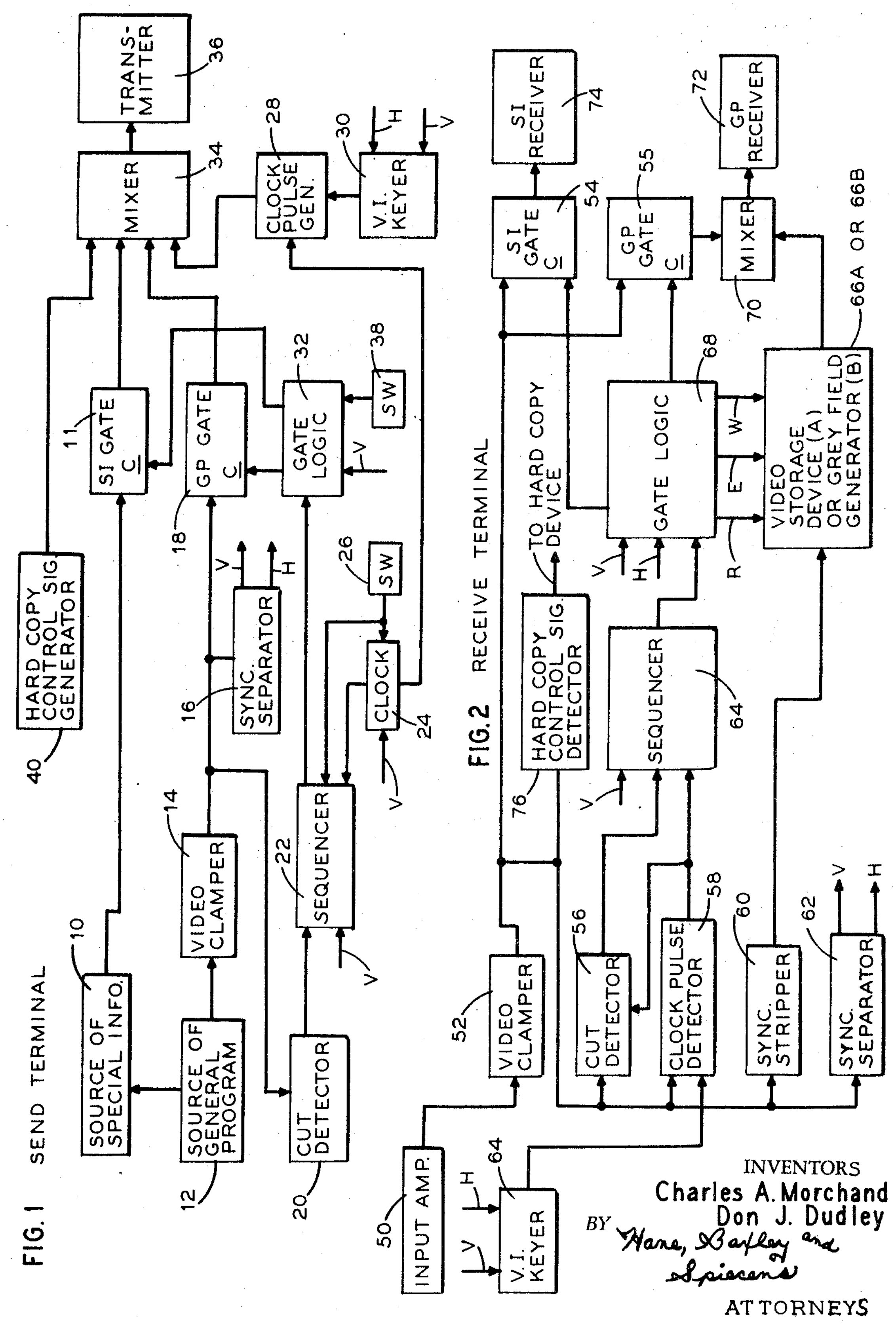
FIG. 1 is a block diagram of the send terminal of a television system utilizing the invention.
FIG. 2 is a block diagram of a receive terminal of the television system utilizing the invention.
Figure 3A:
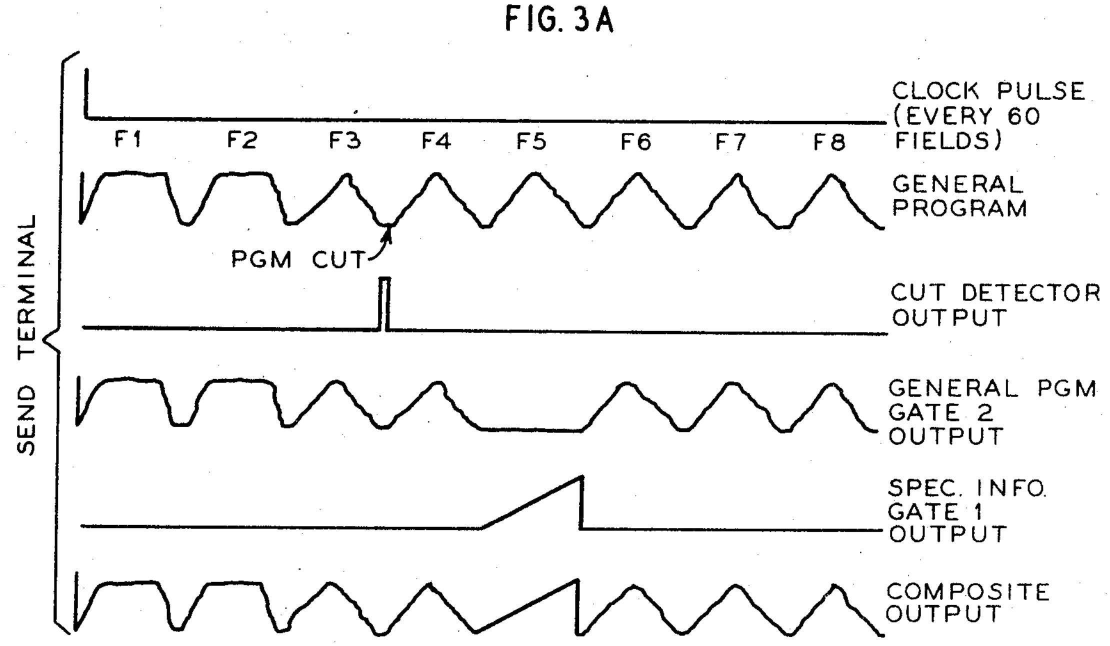
Figure 3B:
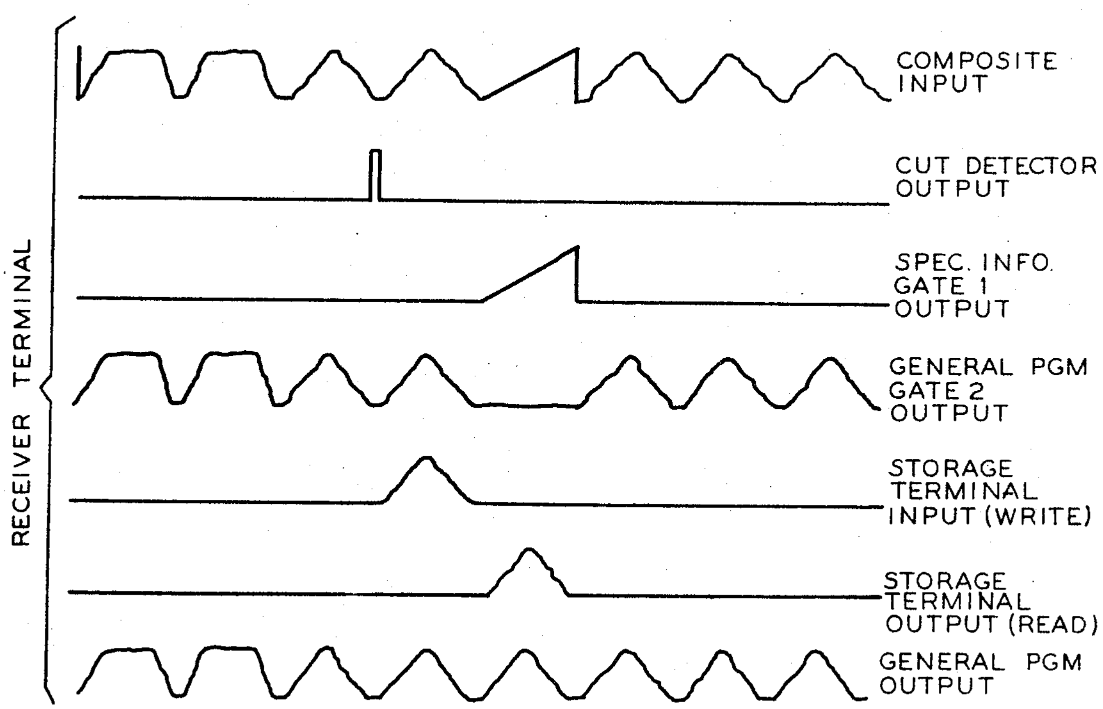
Figure 4:
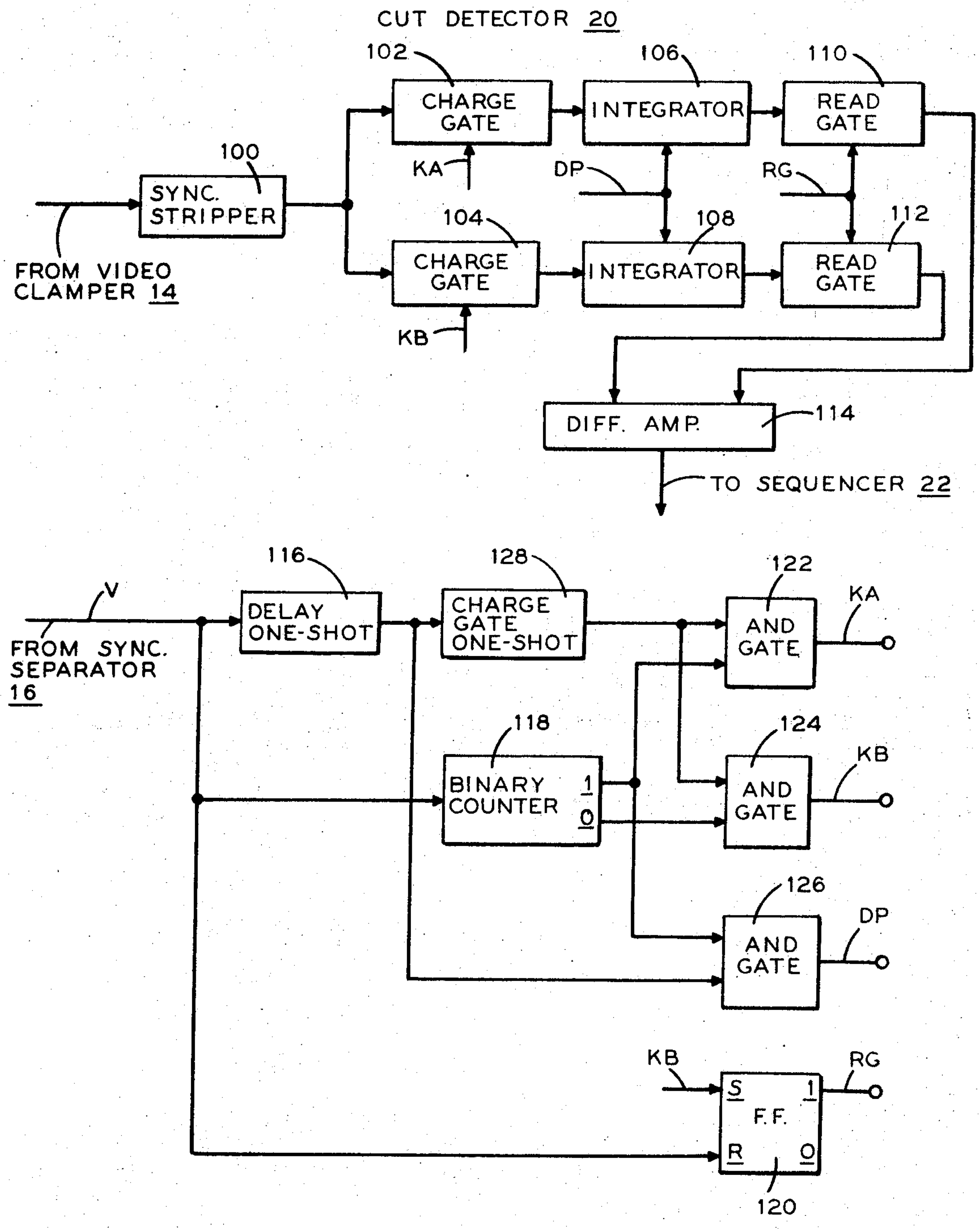
Figure 5:
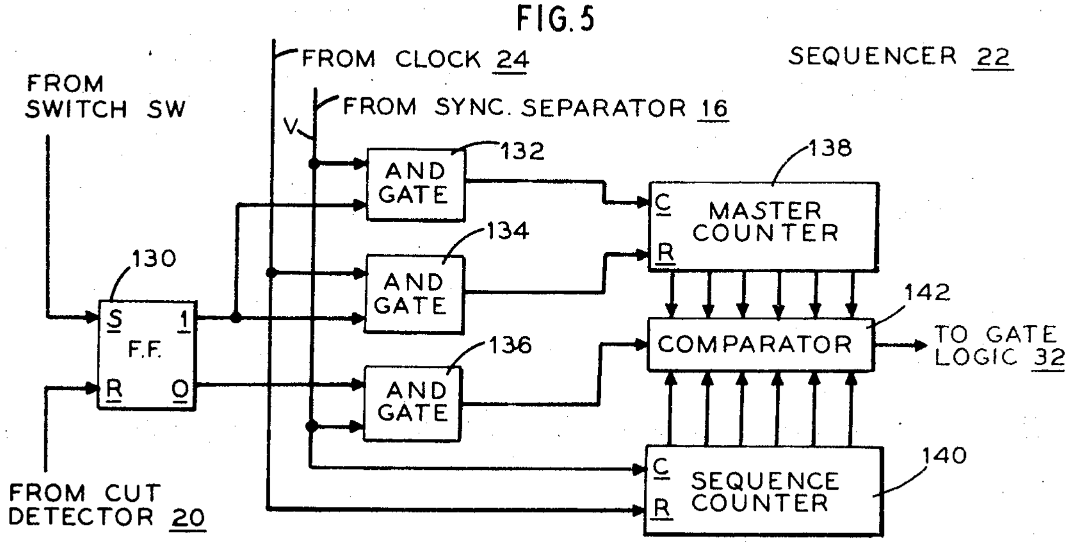
Figure 6:
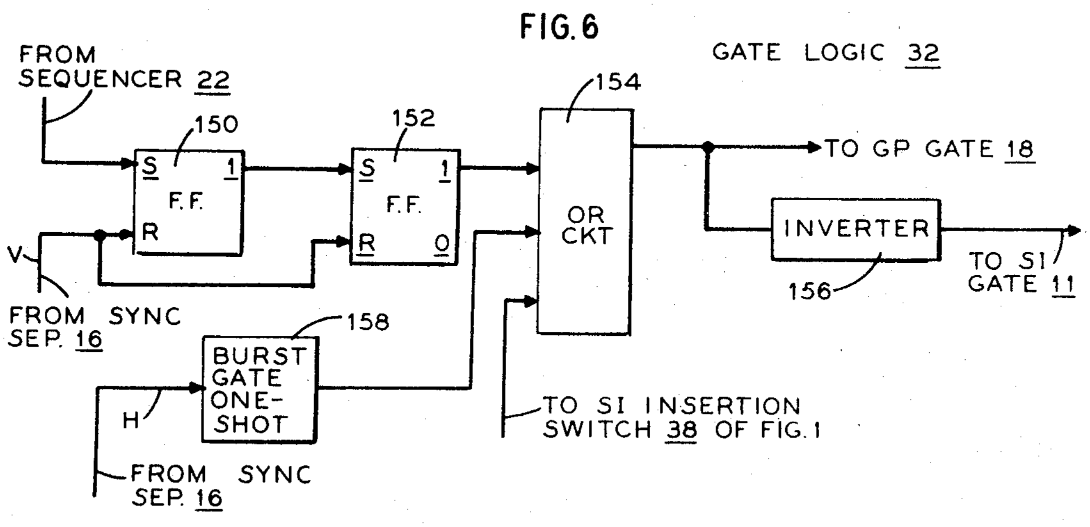
Figure 7:
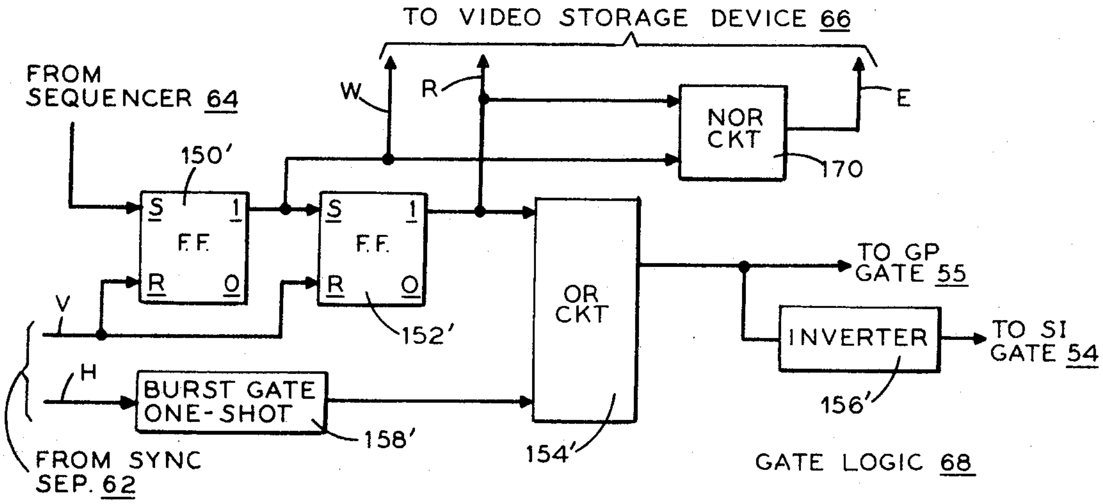
Figure 8A:
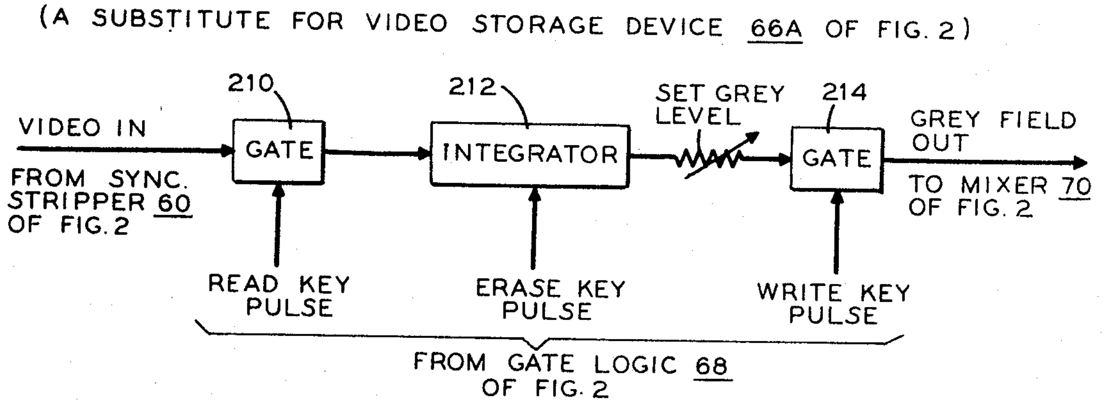
Figure 8B:
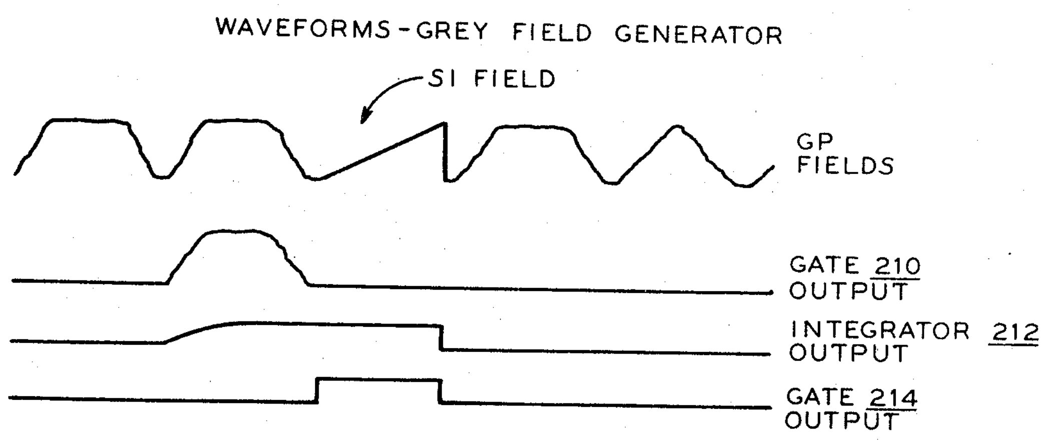

FIG. 3*a* are waveforms of television signals for explaining the operation of the send terminal of FIG. 1;

FIG. 3*b* are waveforms of television signals for explaining the operation of the receive terminal of FIG. 2;

FIG. 4 is a block diagram of the cut detector of the send terminal of FIG. 1;

FIG. 5 is a block diagram of the sequence of the send terminal of FIG. 1;

FIG. 6 is a block diagram of the gate logic of the send terminal of FIG. 1;

FIG. 7 is a block diagram of the gate logic of the receive terminal of FIG. 2; and FIGS. 8*a* and 8*b* are respectively a block diagram of a Grey Field Generator which can be substituted for the Video Storage Device, and wavesforms generated thereby.

Before proceeding with the detailed description of the invention, the general overall operating philosophy of the system will be discussed. At a send terminal there are two sources of television fields. One source generates field of a general viewer television program such as a motion picture, sports event, spectacular or the like. Such fields will be called for simplicity GP fields. The other source generates fields of special viewer information such as pages from a book, biliographies, educational testing and teaching slides, or like. These fields will be called for simplicity the SI fields. The send terminal normally transmits the GP fields. Periodically, one of the GP fields is deleted and an SI field substituted during tranmission. At the receive terminal the GP fields interspersed with the SI fields are serially received over a single channel. Whenever an SI field is received it is extracted from the stream of fields and routed to one receiver. In order to fill the void in the stream of fields, the GP field prior to the extracted SI field is duplicated and the duplicate field fed into the void. Therefore the stream has been reconstructed to contain only GP fields which can be routed to another receiver.

It has been found that as long as the SI fields are a minor fraction, say one in sixty, of the total number of fields transmitted there is no perceptible degradation of the general viewer program. In fact when the source of the GP fields is a kine-recording device it is possible to transmit SI fields every sixth frame without degradation since most kine-recording procedures repeat a film frame every five frames to correct for the timing difference between 24 frames per second on film and 30 frames per second for video transmission. With respect to the SI fields, these fields can be any other television signal locked to the same timing at the GP fields, or any synchronous or asynchronous data, digital or analog, which can be transmitted on a low duty-cycle time-share basis.

In order to identify the SI fields there must be a synchronization between the send terminal and the receive terminal. Accordingly, every sixty fields the send terminal generates a clock pulse which is fed to the receive terminal. Furthermore, the send terminal senses for scene cuts in the general viewer program. When a scene cut is sensed, an SI field substituted for the GP field and a count of the number of fields that have occurred since the clock pulse immediately preceding the scene cut is recorded. Say this number is *n*. Thereafter, an SI field is substituted for each GP field which is the *n*th field after a clock pulse. Similarly, at the receive terminal, scene cuts are sensed and fields are counted with respect to number of fields between the clock pulse and the scene cut to identify the SI fields.

Refer now to FIG. 1. The source of special information 10 generates the SI fields. This source can take many forms, the simplest of which can be a vidicon focussed on a poster or the like. The output of source 10 is fed to the input of SI gate 11. The source of general program 12 generates the GP fields and can be a complete television studio and equipment which generates all the field and frame synchronizing signals, such as the vertical sync pulses V and the horizontal sync pulses H. These sync pulses can be used, in addition to their conventional use, to provide synchronizing pulses for the vidicon of source 10. The GP fields are fed to conventional video clamper 14 to establish a reference black level for subsequent gating and sync separation. The output of video clamper 14 is fed to the input of sync separator 16, the input of GP gate 18, and the input of cut detector 20. Sync separator 16, of conventional design extracts the sync signals from the GP fields and generates the vertical sync pulses V and the horizontal sync pulses H. The GP gate 18 as well as the SI gate 11 are conventional video gates which control the transfer of video signals from their inputs to their outputs under the control of signals received at their control inputs C. The cut detector 20, hereinafter more fully described monitors the GP fields and transmits a pulse to sequencer 22 whenever a scene cut is sensed.

Clock 24 is basically a counter chain which counts the vertical sync pulses V modulo-60 to emit a clock pulse for each 60 vertical sync pulses. The clock 24 is turned on by switch 26 which presets the counter chain and permits the entry of the pulses V. The clock pulses are fed to one input of clock pulse generator 28 which is a two-input AND-circuit whose other input receives pulses from vertical input keyer 30. Keyer 30, of conventional design, emits a pulse at a specific time during the vertical blanking interval of each field under control of the sync signals V AND H. Thus, clock pulse generator 28 emits a recognizable timing signal at a specific time (a transmitted clock pulse) during the vertical blanking interval of every sixtieth field.

In addition, the clock pulses from clock 24 are fed to sequencer 22. The sequencer 22, hereinafter more fully described, performs two functions. It recognizes the local turning-on of clock 24 so that the gating-in of an SI field is initiated from the first cut following the first clock pulse from clock 24; and it counts and remembers the number of fields occurring between a clock pulse and the following cut and cycles the subsequent gating-in of SI fields at the same period following each clock pulse as long as the clock pulses occur. The output of sequencer 22 is fed to gate logic 32. Gate logic 32, hereinafter more fully described, controls the opration of SI gate 11 and GP gate 18 so that they operate in a complementary manner, i.e., when one of the gates is open the other is closed and vice-versa.

It should be noted that switch 38 provides a manual means of locking the SI gate 11 open and the GP gate 18 closed so that only GP fields are transmitted even though the receive terminal will continue its reconstruction process. Then at some point the transmitted signal from the send terminal can start including SI fields.

The outputs of gates 11 and 18 and clock pulse generator 28 are fed to mixer 34 which performs an inclusive-or function and which can be an analog adder. It transmits whatever signals it receives at any one of its inputs to the transmitter 36. Transmitter 36 can be the carrier modulating section of a television transmitter.

The operation of the send terminal will now be described with aid of the waveforms of FIG. 3a. When switch 26 is turned to the on position, the clock 24 is activated and starts emitting a clock pulse for each 60 sync pulses V. These clock pulses are fed to clock pulse generator 28 to permit the generation of the transmitted clock pulses which pass through mixer 34 to transmitter 36. At the same time the clock pulses are fed from clock 24 to sequencer 22 where they clear counters which count fields by counting the sync pulses V. During this time the GP gate 18 is open (transmissive) and the SI gate 11 blocked. Thus GP fields pass from source 12 via clamper 14, GP gate 18 and mixer 34 to transmitter 36. Assume there is a scene cut between GP field *f2* and GP field *f3.* Cut detector 20 detects the cut and at the end of field *f3* emits a pulse to sequencer 22. Sequencer 22 records the fact that the scene cut was sensed at the end of the third field after the clock pulse and desensitizes itself to subsequent outputs from the cut detector until reprimed by switch SW. Sequencer 22 emits a pulse to gate logic 32. Such a pulse will be emitted every sixty fields thereafter. Gate logic 32, one field time after the cut detector 20 indicated the cut to sequencer 22 (at the start of field f5) feeds control signals to gates 11 and 18. SI gate 11 is opened and GP gate 18 is blocked. Thus, transmitted field *f5* (the fifth field after the clock pulse) is from source of special information 10 via SI gate 11 and mixer 34 to transmitter 36. At the end of field *f5* gate logic 32 reverses the signals to the control inputs C of gates 11 and 18, SI gate 11 is blocked and GP gate 18 opened, and GP fields are again transmitted.

Thereafter, because of the recording by sequencer 22 of the fact that the cut was sensed at the end of the third field after a clock pulse, the sequencer 22 will emit a pulse to gate logic 32 to control the gates 11 and 18 so that every fifth field after a clock pulse is an SI field.

The multiplexed GP and SI fields are transmitted via a cable or the like to a receive terminal as shown in FIG. 2. The signals representing the fields are received by input amplifier 30 which can include the R.F. and demodulating sections of a receiver so that the signals are down-converted to baseband. The video signals are fed to video clamper 52 which operates in a similar manner as video clamper 14 of FIG. 1 to perform the same function. The output of video clamper 52 is fed to the input of SI gate 54 (similar to SI gate 11 of FIG.1), to the input of GP gate 55 (similar to GP gate 18 of FIG. 1), to the input of cut detector 56, to the input of clock pulse detector 58 (similar to clock pulse generator 28 of FIG. 1), to the input of sync stripper 60, and to the input of sync separator 62 (similar to sync separator 16 of FIG. 1).

Cut detector 56 is similar to cut detector 20 except that it includes an input gate controlled by a bistable device. When the bistable device is triggered on by the first clock pulse from detector 58 the gate is open and fields from clamper 52 can enter the cut detector 56. (When the receive terminal was first turned on the bistable device was triggered off and the gate is blocked). The output of detector 56 is fed to an input of sequencer 64. Clock pulse detector 58 samples for received clock pulses under the control of vertical interval keyer 64 which is similar to keyer 30 of FIG. 1. The output of clock pulse detector 58 is fed to inputs of cut detector 56 and sequencer 64. Sync stripper 60 of conventional design merely strips the sync pulses from the fields and transmits the so-stripped video fields to an input of video storage device 66.

The sequencer 64 is similar to sequencer 22 of FIG. 1 and operates in the same manner. The gate logic 68, hereinafter more fully described receives a pulse from the sequencer 64 and transmits E, W, and R signals sequentially to video storage device 66 to control operation of the device, and transmits control signals to gates 54 and 55 to open and block these gates in a complementary manner. The video storage device 66A is a storage device for storing one field of video signals. A stored field can be erased in response to a signal on line E, a new field received at the input from sync stripper 60 can be written into the storage in response to a signal on line W and the stored field can be transferred from an output to mixer 70 in response to a signal on line R. Such devices are presently available and can be of the type PEP 400 manufactured by Princeton Electronic Products of Princeton, New Jersey.

Another type of reconstruction which could be used within the spirit of this invention is shown in FIG. 8. The GP field preceding the SI field is reconstructed by means of average light rather than detail. In this instance, the Video Storage Device 66A of FIG. 2 is replaced by Grey Field Generator 66B of FIG. 2. A solid grey field whose brightness is a function of the average brightness of the preceding GP field is substituted for the SI field. This will not disturb the GP viewer and is a less expensive means than the Video Storage Device 66A.

Mixer 70 can be similar to mixer 34 of FIG. 1 except it has two inputs, one connected to the output of video storage device 66A and the other connected to the output of GP gate 55. The output of mixer 70 is connected to GP receiver 72 which can take many forms such as a transmitter similar to transmitter 36 of FIG. 1 for further relaying or a CRT monitor for direct viewing of the general viewer television program.

The output of SI gate 54 is connected to the input of SI receiver 72 which can be a CRT monitor or even a hard copy generator such as the Honeywell Model 1806A Printer or Fairchild Oscillograph Recording Camera.

The operation of the receive terminal will now be described with the aid of the waveforms of FIG. 3*b*. It is understood that the same signals transmitted by the send terminal are now being received.

A transmitted clock pulse is first received followed by fields *f1* and *f2*. Since gate 55 is open and gate 54 blocked at this time fields *f1* and *f2* will pass to GP receiver 72 as will field *f3*. All this time cut detector 56 has been monitoring the received fields since it was primed by the received clock pulse. Because there was a scene cut between fields *f2* and *f3*, it detects the cut and transmits a pulse to sequencer 64 at the end of field *f3*. Sequencer 64 records the fact that the cut was detected at the end of field *f3* and immediately transmits a pulse to gate logic 68 and will thereafter transmit such a pulse every sixty field times, i.e., a pulse at the end of the third field following a received clock pulse. The gate logic 68 normally transmits an erase control signal on line E causing storage device 66 to erase any stored field but in response to such a pulse transmits a write signal on line W to storage device 66A which lasts for one field time. Therefore, field *f4* in addition to passing through gate 55 to mixer 70 is also recorded in storage device 66, via clamper 52 and sync stripper 60. At the start of field *f5*, the second field after sequencer 64 transmitted a pulse to gate logic 68, gate logic 68 transmits control signals to open SI gate 54 and to close GP gate 55 for one field time. Gate logic 68 at the same time transmits a signal on line R (Read) to storage device 66 which starts transmitting the stored field (field *f4*) to mixer 70. Thus, field f5 (a special information field) is routed to SI receiver 74 and blocked from entering GP receiver 72. Instead at the time of field *f5*, the stored field which is a duplicate of field *f4* is fed to GP receiver 72. This phenomenon is repeated once every 60 field times thereafter as long as the send terminal transmits clock pulses.

It should be noted that in order to increase the rate of transmission of SI data, it is only necessary to increase the clock rate (i.e., clock 24 at send terminal). For example, if clock 24 has a count of 10 rather then 60, SI fields will be inserted in the GP every 10 fields. The reconstruction process at the receive terminal will automatically re-adjust to the new clock rate.

It should also be noted that the turning on or off of any copying device, used to make hard copy of the SI fields at the receive terminal, takes place at the receive terminal, or by automatic means through the use of control signals transmitted from the send terminal (i.e., Hard Copy Control Signal Generator 40 of FIG. 1 and Hard Copy Control Signal Detector 76 of FIG. 2 by means of a tone or pulse code).

This tone or pulse code could provide the following time-sequenced controls:

1. Turn on power to copy device (for warm-up).
2. Initiate copying.
3. Stop copying.
4. Turn off power to copying device.

This code would work in concert with the clock pulse to provide hard copy as required.

The various non-standard elements of the system will now be described.

Cut detector 20 of FIG. 4 receives the signals representing the fields from video clamper 14 and feeds them to sync stripper 100 for removing the sync pulses from the fields. The output of sync stripper 100 is fed to the inputs of charge gates 102 and 104, conventional video gates whose binary transmission state is controlled by signals of lines KA and KB respectively. When a signal is present of line KA, gate 102 is open and transmits signals from its output to the input of integrator 106. Similarly when a signal is present of line KB, gate 104 is open and transmits signals from its output to the input of integrator 108. As will hereafter become apparent the signal on line KA is present during alternate fields, and the signal on line KB is present for the other fields. It will be assumed that there is a signal present on line KA for odd numbered fields and on line KB for even numbered fields. Each of the integrators 106 and 108 can be conventional sample-and-hold devices which store a charge until discharged. The only limitation is that they have time constants such that they do not saturate for even a full-white video signal during the time their respective charge gates are transmissive. In any event integrator 106 accumulates a charge related to the "white" contents of an odd field while integrator 108 accumulates a charge similarly related to the "white" content of the next even field. These charges are stored without loss until they are discharged by the integrators in response to a signal on line DP which occurs as the start of each odd field. However, just prior to the discharge a signal is received at the control inputs of read gates 110 and 112 (conventional video gates). In response to these signals, the output of integrator 106 is connected to a first input of differential amplifier 114, and the output of integrator 108 is connected to the second input of differential amplifier 114. The gain of the amplifier is adjusted to provide an output when the levels of the input signals differ by a substantial amount. This will occur when the "white" content of two successive fields are considerably different i.e., when there is a scene cut.

The remaining circuitry is directed to the logic for generating the signals on lines KA, KB, DP and RG. The vertical sync pulse V associated with an odd field is fed to the input of delay one-shot 116, to the input of binary counter 118 and to the reset terminal of flip-flop 120. The delay one-shot 116 can be a monostable multivibrator which emits a pulse having a duration of a fraction of a field period whenever it receives a pulse at its input. The binary counter 118 can be a one stage binary counter. The flip-flop 120 can be a bistable-multivibrator that is toggled to the "1" state by the trailing edge of a signal received at its "S" input and is toggled to the "0" state by the trailing edge of a signal received at its "R" input. Accordingly, the odd field pulse on line V toggles the flip-flop 120 to the "0" state and there is no signal on line RG and triggers the binary counter 118 to the "1" state causing the feeding of a signal to one input of AND gates 122 and 126 and terminating a signal to one input of AND gate 124. The AND gates are conventional two-input binary logic AND circuits. At this time the AND gates 122 and 126 are open while AND gate 124 is blocked. In addition, the odd field pulse on line V triggered delay one-shot 116 which transmits a pulse to the second input of the open AND gate 126 (which signal is fed via line DP to discharge the integrators 106 and 108) and to the input of charge gate one-shot 128. One-shot 128 can be a monostable multivibrator which when triggered emits a pulse having a duration which is less than a field period. The output of one-shot 128 is connected to the second inputs of AND gates 122 and 124. Thus, since AND gate 122 is alerted at this time and AND gate 124 is blocked, AND gate 122 transmits a pulse of line KA which opens charge gate 102. When the next sync pulse (associated with an even field) is on line V, flip-flop 120 remains reset, but binary counter 118 is triggered to the "0" state alerting AND gate 124 and blocking AND gates 122 and 126. Delay one-shot 116 is again triggered and emits a pulse which passes through AND gate 124 to give a pulse on line KB which opens charge gate 104. The trailing edge of the pulse on line KB toggles flip-flop 120 to the set state causing the transmission of a signal on line RG which opens read gates 110 and 112. The third pulse on line V toggles flip-flop 120 to the "0" state terminating the signal on line RG. The third pulse on line V triggers binary counter 118 to the "0" state blocking AND gates 124 and opening AND gates 122 and 126. This pulse on line V also triggers delay one-shot 116 which in turn triggers charge gate-one shot 128 causing a pulse to pass through AND gate 122 to line KA. In addition the output of delay one-shot 116 causes AND gate 126 to emit a integrator discharge pulse on line DP, and the cycle continues repeating thereafter.

The sequencer 22 shown in FIG. 5 includes the flip-flop 130, similar to flip-flop 120 of FIG. 4. When switch SW (FIG. 1) is turned on flip-flop 130 is set to the "1" state. Since the "1" output of flip-flop 130 is fed to one input of each of the AND gates 132 and 134, these gates open, and since the "0" output of flip-flop 130 is connected to one input of AND gate 136 this gate is blocked.

The second input of AND gate 132 is connected to line V and the output of AND gate 132 is connected to master counter 138, a resettable binary counter chain. Therefore, master counter 138 counts fields. Furthermore, since the second input of AND gate 134 is connected to clock 24 and the output of AND gate 134 is connected to the reset input of counter 138, the counter is always cleared when a clock pulse is received as long as flip-flop 130 is set to "1." At the same time the count input C of sequence counter 140 (similar to counter 138) unconditionally receives the pulses on line V and the reset input R unconditionally receives clock pulses. Accordingly, after the first clock pulse following the setting of the flip-flop 130 to the "1" state the counters are in synchronism.

When a scene cut is detected the flip-flop 130 is set to the "0" state. AND gates 132 and 134 become blocked and the count of the number of fields following the clock pulse when the cut was detected is trapped in counter 138. Since the "0" output of flip-flop 130 is connected to one input of AND gate 136 this gate opens feeding the pulses on line V to comparator 142, a sampled comparator which compares the counts in the two counts for equality and passes the pulse from AND gate 136 to gate logic 32. The comparator 142 can be a convention parallel equality comparator. Since, when the cut is detected, the counters are in synchronism (contain the same counts) a pulse is emitted to gate logic 32. Thereafter, each time sequence counter 140 accumulates a count equal to the count stored in master counter 138 another pulse is transmitted to logic 32.

Gate logic 32 of the send terminal is shown in FIG. 6. The trailing edge of the pulse from sequencer 22 which is fed to the set input of flip-flop 150 toggles the flip-flop to the "1" state generating a signal at its "1" output. The next vertical sync pulse received by the reset input R of the flip-flop 150 toggles the flip-flop to the "0" state terminating the signal at its "1" output. The "1" output of flip-flop 150 is connected to the set input S of flip-flop 152 and when the signal terminates at the "1" output of the former its trailing edge sets the flip-flop 152 to the "1" state. The next pulse of line V which is connected to the reset input of flip-flop 152 toggles it to the "0" state terminating the signal at the "1" output. The net result is that whenever gate logic 32 receives a pulse from sequencer 22, the "1" output of flip-flop 152 emits a gating signal having a duration of one field time and starting one field time after the pulse from sequencer 22.

The "1" output of flip-flop 152 is connected to one input of conventional inclusive-or circuit 154 whose output is connected directly to GP gate 18 of FIG. 1 and via inverter to SI gate 11 of FIG. 1. The second input of OR circuit 154 is connected to the output of burst gate one-shot 158 whose input is connected to line H. One-shot 158 can be monostable multivibrator which is triggered on by the leading edge of a pulse on line H to emit a pulse having a duration sufficiently long to encompass the horizontal sync pulse and the immediately following color burst in each raster line.

The net result is that GP gate 18 is transmissive to all sync pulses and all fields except the second field following the detection of a scene cut and every 60th field thereafter while SI gate 11 is blocked whenever GP gate 18 is transmission.

FIG. 6 shows the gate logic 68 of the receive terminal of FIG. 2. Since most of the elements are the same as the elements of gate logic 32 of FIG. 6, primed reference characters are used for like elements and only the differences will be discussed. In fact the only difference is that the "1" output of flip-flop 150' transmits the write control signal on line W to storage device 66, and the "1" output of flip-flop 152' transmits the read control signal on line R to storage device 66. The "1" outputs of both flip-flop are fed to inputs of conventional NOR circuit 170 whose output transmits the erase control signal on line E to storage device 66. Thus, during the first field after the pulse from sequencer 64 a signal is present on line W, and during the next field a signal is present on line R and at all other times a signal is present on line E.

It should be noted that through the use of variable delays such as binary counters counting field pulses, the number of fields between the occurance of a cut and the insertion of the SI could be varied from two to one less than the number of fields between clock pulses.

While only one embodiment has been shown in describing the invention, there will now be obvious to those skilled in the art many modifications and variations satisfying many or all of the objects of the invention but which do not depart from the spirit thereof as defined by the appended claims.

What is claimed is:

1. A method for transmitting a general viewer television program and a special viewer program on a common channel wherein the general viewer television program includes at least one scene cut, said method comprising sequentially transmitting a plurality of related fields of the general viewer television program including a scene cut, sensing for the scene cut in the general viewer television program, transmitting a field of the special viewer program in response to the sensing of the scene cut and thereafter periodically transmitting a field of the special viewer program for a given number of fields of the general viewer television program.

2. The method of claim 1 further comprising the step of periodically generating and transmitting a clock signal for each same given number of fields of the general viewer television program.

3. The method of claim 2 further comprising the step of storing a value related to the number of fields of the general viewer television program occurring between a generated clock signal and the sensing of the scene cut for determining when to transmit a field of the special viewer program.

4. A method of transmitting and receiving a general viewer television program anda special viewer program on a common channel wherein the general viewer television program includes at least one scene cut, said method comprising sequentially transmitting a plurality of related fields of the general viewer television program with at least one scene cut, sensing for a scene cut in the general viewer television program, transmitting a field of the special viewer program in response to the sensing of the scene cut, receiving all the transmitted fields, locating the field of the special viewer program through the agency of the scene cut, replacing the field of the special viewer program by a gray field having a birghtness level which is a function of the average brightness of the adjacent field of the general viewer television program and retransmitting the fields of the general viewer television program and the gray field.

5 A method of transmitting and receiving a general viewer television program and a special viewer program on a common channel wherein the general viewer television program includes at least one scene cut, said method comprising sequentially transmitting a plurality of related fields of the general viewer television program with at least one scene cut, sensing for a scene cut in the general viewer television program, transmitting a field of the special viewer program in response to the sensing of the scene cut, receiving all the transmitted fields, locating the field of the special viewer program through the agency of the scene cut, replacing the field of the special viewer program by an adjacent field of the general viewer television program and retransmitting the fields of the general viewer television program and said adjacent field of the general viewer information.

6. The method of claim 5 further comprising the steps of retransmitting the replaced fields to a hard copier and activating the hard copier by signals associated with the transmitted fields.

* * * * *